(12) United States Patent
Yoshiura et al.

(10) Patent No.: US 9,231,270 B2
(45) Date of Patent: Jan. 5, 2016

(54) LITHIUM-ION BATTERY

(75) Inventors: Tadashi Yoshiura, Tokyo (JP); Yuichiro Mishiro, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 74 days.

(21) Appl. No.: 13/983,980

(22) PCT Filed: Feb. 15, 2012

(86) PCT No.: PCT/JP2012/053543
§ 371 (c)(1),
(2), (4) Date: Aug. 6, 2013

(87) PCT Pub. No.: WO2012/111712
PCT Pub. Date: Aug. 23, 2012

(65) Prior Publication Data
US 2013/0316208 A1    Nov. 28, 2013

(30) Foreign Application Priority Data

Feb. 16, 2011    (JP) ................................. 2011-030617

(51) Int. Cl.
| | |
|---|---|
| *H01M 10/052* | (2010.01) |
| *H01M 10/04* | (2006.01) |
| *H01M 2/22* | (2006.01) |

(Continued)

(52) U.S. Cl.
CPC ............ *H01M 10/0431* (2013.01); *H01M 2/22* (2013.01); *H01M 2/263* (2013.01); *H01M 2/305* (2013.01); *H01M 10/0422* (2013.01); *H01M 10/052* (2013.01); *H01M 10/0525* (2013.01); *H01M 10/0587* (2013.01); *H01M 10/4235* (2013.01); *H01M 2/12* (2013.01); *H01M 2/36* (2013.01); *Y02E 60/122* (2013.01); *Y02T 10/7011* (2013.01)

(58) Field of Classification Search
CPC .......... H01M 10/052; H01M 10/4235; H01M 10/0431; H01M 10/0422; H01M 2/305
See application file for complete search history.

(56) References Cited

U.S. PATENT DOCUMENTS 5,849,431 A * 12/1998 Kita et al. ..................... 429/164

FOREIGN PATENT DOCUMENTS

| JP | 9-92250 A | 4/1997 |
|---|---|---|
| JP | 9-92338 A | 4/1997 |
| JP | 3633056 B2 | 4/1997 |
| JP | 10-125347 A | 5/1998 |
| JP | 11-312509 A | 11/1999 |

(Continued)

OTHER PUBLICATIONS

Corresponding International Search Report with English Translation dated May 22, 2012 (five (5) pages).
Japanese-language Written Opinion dated May 22, 2012 (PCT/ISA/237) (four (4) pages).

*Primary Examiner* — Barbara Gilliam
*Assistant Examiner* — Angela Martin
(74) *Attorney, Agent, or Firm* — Crowell & Moring LLP

(57) ABSTRACT

The present invention provides a cylindrical lithium-ion secondary battery. The lithium-ion battery of the present invention has a structure in which the value of B/A is optimized, where the distance between an electrode pole to which strip-form lead pieces are welded, the lead pieces being formed intermittently in the winding direction, which is the longitudinal direction of the belt-like electrodes, and the inner wall of the battery can is represented by A, and the distance between the electrode pole and the wound electrode group is represented by B, in order to secure an exhaust passage for the gas generated upon occurrence of an abnormality in the battery.

2 Claims, 2 Drawing Sheets

(51) Int. Cl.
*H01M 2/26* (2006.01)
*H01M 10/0587* (2010.01)
*H01M 10/42* (2006.01)
*H01M 2/30* (2006.01)
*H01M 10/0525* (2010.01)
*H01M 2/12* (2006.01)
*H01M 2/36* (2006.01)

(56) References Cited

FOREIGN PATENT DOCUMENTS

| | | |
|---|---|---|
| JP | 2004-234994 A | 8/2004 |
| JP | 2007-165117 A | 6/2007 |
| JP | 2009-176452 A | 8/2009 |

* cited by examiner

LITHIUM-ION BATTERY

TECHNICAL FIELD

The present invention relates to the structure of a lithium-ion battery, in particular, the structure of the periphery of an electrode pole of a battery.

BACKGROUND ART

In recent years, against a background of environmental problems, secondary batteries typified by lithium-ion batteries have been applied not only to moving objects such as hybrid electric vehicles (HEV), electric vehicles (EV), forklifts, and loading shovels but also to industrial uses such as uninterruptible power systems (UPS) and power storage for photovoltaic power generation. With the expansion of the uses of the secondary batteries, an increase in the capacity as well as an increase in the energy density is demanded. In addition to increasing the performance, increasing the safety is also a significant challenge to be addressed. Among the secondary batteries are nickel-cadmium batteries, nickel-hydrogen batteries, and lithium-ion batteries. As cadmium is toxic, the nickel-cadmium batteries have been replaced with nickel-hydrogen batteries and lithium-ion batteries. Among all the currently available secondary batteries, lithium-ion secondary batteries are particularly suitable for increasing the energy density, and thus are actively developed even now.

The main components of a nickel-hydrogen battery and a lithium-ion secondary battery are a metallic current collector (a negative electrode) having a negative electrode active material layer formed on a surface thereof, a separator that retains an electrolyte, and another metallic current collector (a positive electrode) having a positive electrode active material layer formed on a surface thereof. In regard to a nickel-hydrogen battery, the positive electrode contains nickel oxide, and the negative electrode contains a hydrogen storage alloy. In regard to a lithium-ion secondary battery, the positive electrode contains lithium-metal oxide, and the negative electrode contains a carbon material such as graphite.

The battery structures are broadly divided into a wound structure in which a belt-like negative electrode, separators, and a positive electrode are wound in a spiral fashion, and a stacked structure in which strip-like negative electrodes, separators, and positive electrodes are alternately arranged. In the case of a wound, hermetically sealed battery with the wound structure, gas generated in the battery can should be promptly and smoothly guided to a portion around a gas exhaust valve, while how to arrange lead pieces for electrically connecting the belt-like negative electrode or positive electrode group to an electrode pole, which connects to a battery terminal, is a factor to decide the passage for the gas.

Among the gas exhaust mechanisms of the wound, hermetically sealed batteries is the invention disclosed in Patent Literature 1. Patent Literature 1 discloses that, when a plurality of lead pieces exist in a manner overlapping each other, between an end face of a wound electrode plate group and a battery cap, which is located opposite thereto and has a gas exhaust valve, a failure that a gas passage may be blocked is avoided by forming a gas passage by shifting the phase of the arrangement of the lead pieces on the electrode plate in winding the electrode plate such that the arrangement is not at regular intervals and thus intentionally creating a gap. Further, there may also be cases where a gas passage is provided by providing holes in the electrode pole arranged on the exhaust passage for the gas.

CITATION LIST

Patent Literature

Patent Literature 1: JP 3633056 B

SUMMARY OF INVENTION

Technical Problem

However, as described in Patent Literature 1, there may be cases where the position control for the lead pieces cannot be performed prior to the winding step due to the uneven thickness of the electrode plate, so that it becomes difficult to ensure a gas passage. An object of the present invention is to improve the degassing effect for the gas generated in the battery without controlling the positions of lead pieces prior to the step of winding the electrode plate group.

Solution to Problem

A lithium-ion battery, which is an exemplary wound, hermetically sealed battery of the present invention, has a cleavage valve that, when gas is generated in the battery and the internal pressure of the battery can exceeds a predetermined pressure due to the gas, cleaves and discharges the gas to the outside of the can. However, unless a gas passage in the battery is taken into consideration, the internal pressure of the battery can reach the strength limit of the battery can, which could result in swelling or rupture of the battery.

In order to solve such a problem, the present invention provides the structure of a wound, hermetically sealed battery illustrated in FIG. 2 in which, provided that the distance from the inner wall of a battery can to an electrode pole is represented by A, and the distance from a wound electrode group to the electrode pole is B, the distance B in relation to the distance A is optimized to control, in exhausting a flow of gas generated in the battery, that is, in exhausting the gas, the flow of gas more promptly and smoothly, and exhaust the gas to the outside of the can.

Specifically, it is considered that the aforementioned object can be achieved by providing the following structure.

Provided is a lithium-ion battery including: a wound electrode group, the wound electrode group being formed by winding a positive electrode having a negative electrode active material layer formed on a surface thereof, a separator that retains an electrolyte, and a negative electrode having a positive electrode active material layer formed on a surface thereof, around an axial core; an electrode pole arranged between the wound electrode group and a battery terminal, the electrode pole being configured to contribute to an electrical connection between the wound electrode group and the battery terminal; and lead pieces formed in strip form on an active-material-non-applied portion provided on a side of each of the positive electrode and the negative electrode, the lead pieces being electrically connected to the electrode pole. The wound electrode group, the electrode pole, and the lithium-ion piece are housed in a battery can. A value of B/A is 1.4 to 2.6, where a distance from an inner wall of the battery can to the electrode pole is represented by A, and a distance from the wound electrode group to the electrode pole is represented by B.

At this time, the value of the B/A is preferably 1.6 to 2.0.

Alternatively, the lithium-ion battery further preferably includes a gap between the wound electrode group and the electrode pole.

As a further alternative, the lithium-ion battery further preferably includes a spacer arranged at a portion connecting the axial core and the electrode pole.

Moreover, the electrode pole is preferably cylindrical in shape.

Advantageous Effects of Invention

The present invention can provide a wound, hermetically sealed battery with higher safety that can improve the degassing effect for the gas generated in the battery without controlling the positions of lead pieces prior to the step of winding the electrode plate group.

DESCRIPTION OF EMBODIMENTS

A battery is, in order to have the safety of the battery ensured, provided with a safety mechanism portion such as a safety valve. A high-capacity lithium-ion secondary battery with high energy density may suffer a higher degree of damage as compared to conventional lithium-ion secondary batteries when rupture, firing, or the like occurs due to short or the like that is caused by improper use such as overcharge or mixture of foreign substances. Therefore, when an abnormality such as thermal runaway occurs in a high-capacity lithium-ion secondary battery with high energy density, it is necessary to release the inherent energy to the outside of the battery so that rapture or firing does not occur. This function is served by a safety valve. It is also important to optimize the passage for degassing.

Figure 1:
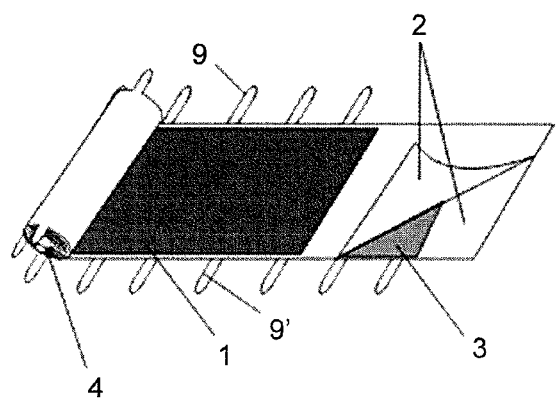
FIG. 1 is a structural view of a wound electrode group illustrating an embodiment of the present invention.
Figure 2:
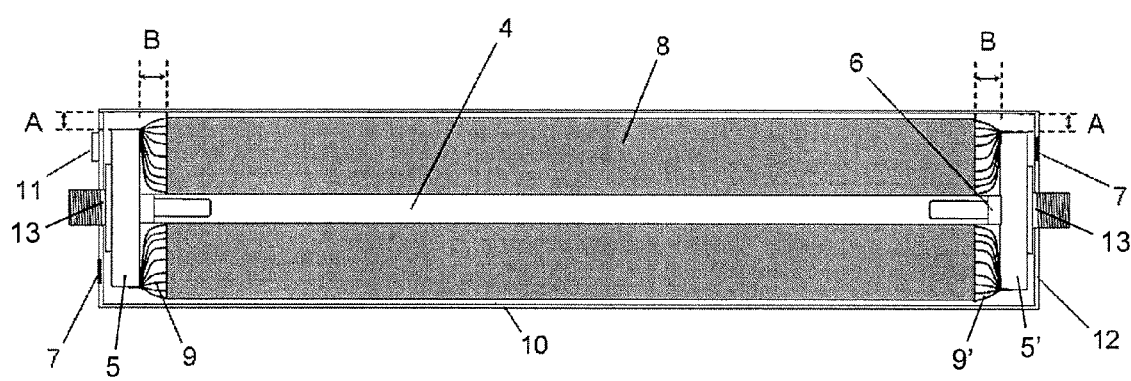
FIG. 2 is a cross-sectional view of a primary part of a battery illustrating an embodiment of the present invention.
Figure 3:
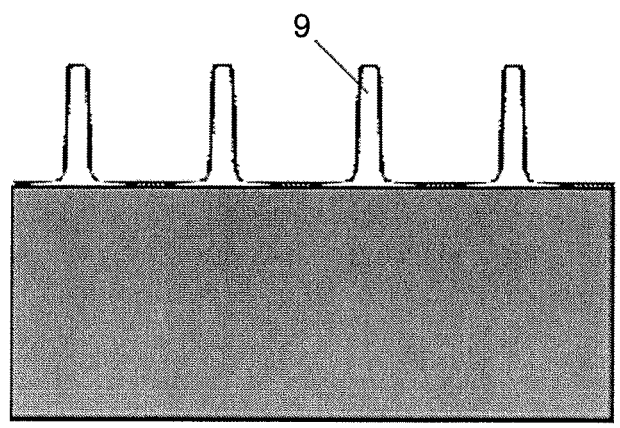
FIG. 3 is an enlarged view of an electrode unit illustrating an embodiment of the present invention.

A lithium-ion battery that is an embodiment applied to the present invention will be specifically described with reference to the drawings. FIG. 1 is a development view of a wound electrode group that is applicable to the present invention, FIG. 2 is a cross-sectional view of a primary part of a lithium-ion battery of the present invention, and FIG. 3 is an expanded view of an electrode to which the present invention can be applied.

The present embodiment is a cylindrical battery in which a wound electrode group 8 is housed in a cylindrical battery container 10.

The wound electrode group 8 is obtained by winding a belt-like negative electrode 3 and a belt-like positive electrode 1 around an axial core 4 with separators 2 interposed therebetween, as shown in FIG. 1. Hereinafter, a method for producing the positive electrode 1 and the negative electrode 3 will be described.

To produce the positive electrode 1, the following method was adopted. Flake graphite as a conductive material and polyvinylidene fluoride as a binder are added to the powder of lithium manganese oxide ($LiMn_2O_4$) as an active material. Further, N-methylpyrrolidone is added thereto as a dispersion solvent and is mixed to produce slurry. Then, the slurry is applied to the opposite faces of an aluminum foil to produce an electrode plate. At this time, one of the side ends of the electrode plate in the longitudinal direction was left as a non-applied portion with a width of about 20 mm. After that, the electrode plate was dried, pressed, and cut to obtain a positive electrode plate. Cutouts shown in FIG. 3 were formed in the non-applied portion. Portions that remain after the cutouts are formed become lead pieces 9. A product that is finally obtained through the aforementioned steps is the positive electrode 1.

To produce the negative electrode 3, the following method was adopted. Acetylene black as a conductive agent and polyvinylidene fluoride as a binder are added to an amorphous carbon material as an active material. Then, N-methylpyrrolidone is added thereto as a dispersion solvent and is mixed to produce slurry. Then, the slurry is applied to the opposite faces of a rolled copper foil to produce an electrode plate. At this time, one of the side ends of the electrode plate in the longitudinal direction is left as a non-applied portion. After that, the electrode plate was dried, pressed, and cut to obtain a negative electrode plate. Cutouts similar to those of the positive electrode 1 are formed in the non-applied portion to form lead pieces 9'. A product that is finally obtained through the aforementioned steps is the negative electrode 3.

As a method for producing a battery, the method shown below was adopted. The positive electrode 1 and the negative electrode 3 produced with the aforementioned method are wound together with the separators 2 made of polyethylene. The positive electrode 1 and the negative electrode 3 are wound such that the lead pieces 9 of the positive electrode 1 and the lead pieces 9' of the negative electrode 3 are located on opposite ends of the wound electrode group 8. The resulting wound electrode group 8 is in a state in which the lead pieces 9, 9' protrude from the opposite end faces of the wound electrode group 8 substantially across the entire faces.

After that, a spacer 6 in a hollow columnar shape, which is made of polypropylene, is arranged on substantially an extended line of the axial core 4, which is the central axis of the wound electrode group 8, to prevent contact between an electrode pole 5 and an edge face of the wound electrode group 8. The spacer 6 in a hollow columnar shape connects to a protruding portion that protrudes from the electrode pole 5 in a columnar shape. In addition, the lead pieces 9 that are lead from the positive electrode 1 are deformed such that they are in contact with the electrode pole 5 in a columnar shape across the whole outer circumference thereof (FIG. 2). Using the electrode pole 5 in a columnar shape can facilitate the deformation of the lead pieces 9 in making the lead pieces 9 into contact with the electrode pole 5, and can prevent disconnection that would otherwise occur due to the deformation of the lead pieces 9. After making the lead pieces 9 into contact with the electrode pole 5, the lead pieces 9 and the outer circumference portion of the electrode pole 5 in a columnar shape were subjected to ultrasonic welding to obtain electrical connection, and then unnecessary portions were cut out. Herein, the distance B was changed in 10 stages, from 2.9 mm to 8.7 mm by varying the height of the spacer 6, so that a total of ten batteries with different distances B were produced. Meanwhile, an operation of connecting the lead pieces 9', which are led from the negative electrode 3, and an electrode pole 5' in a columnar shape of the negative electrode were carried out in a similar way to the aforementioned operation.

After that, the wound electrode group 8 is inserted into a cylindrical battery can 10, and then a battery cap 12 with a cleavage valve 7 for exhausting gas generated in the battery can is provided to seal the open portions on the opposite sides of the battery container 10. At this time, battery terminals 13 for external connection are arranged at positions on the opposite end portions of the battery container 10 in the longitudinal direction. Accordingly, the electrode poles 5, 5' are arranged between the wound electrode group 8 and the battery terminals 13, and contribute to electrical connection between the wound electrode group 8 and the battery terminals 13. Then, a predetermined amount of an electrolytic solution is injected into the battery container through an electrolytic solution injection port 11 of the battery cap 12, and the electrolytic solution injection port 11 is sealed to produce a cylindrical lithium-ion battery. For the electrolytic solution, a solution, which is obtained by dissolving lithium hexafluorophosphate (LiPF$_6$) in a mixed solvent of ethylene carbonate, dimethyl carbonate, and diethyl carbonate, was used (examples).

Overcharge tests for the lithium-ion batteries produced through the aforementioned method were conducted. Examples of the present invention will be described with reference to the drawings and table. FIG. 2 is a cross-sectional view of a primary part of a secondary battery to which the present invention is applied.

In the present invention, the distance from the inner wall 10 of the cylindrical battery can 10 to the electrode poles 5,5' shown in the drawing is represented by A, and the distance from an edge face of the wound electrode group 8 to the electrode poles 5,5' is represented by B. Table 1 shows the result of the test conducted for each battery. As the results in the table, the appearance of the cylindrical battery can 10 is determined to be ○, Δ, or x, and is defined as follows: ○ indicates the same appearance of the battery can as that before the overcharge test, Δ indicates the appearance of the battery can that appears to have swelled but has no problem, and x indicates the appearance of the battery can with a hole. In addition, the presence or absence of crimps of the lead pieces 9, 9' is also shown as a complex element. With regard to the results in the table, ○ and Δ were determined to be safe in the present tests, and above all, batteries evaluated as ○ were determined to be safer.

TABLE 1

| A[mm] | B[mm] | B/A | Safety | Tab Disconnection (Workability) |
|---|---|---|---|---|
| 2.9 | 2.90 | 1.0 | x | Present |
| 2.9 | 3.48 | 1.2 | x | Present |
| 2.9 | 4.06 | 1.4 | Δ | Present |
| 2.9 | 4.64 | 1.6 | ○ | Absent |
| 2.9 | 5.22 | 1.8 | ○ | Absent |
| 2.9 | 5.80 | 2.0 | ○ | Absent |
| 2.9 | 6.38 | 2.2 | Δ | Absent |
| 2.9 | 6.96 | 2.4 | Δ | Absent |
| 2.9 | 7.54 | 2.6 | Δ | Absent |
| 2.9 | 8.12 | 2.8 | x | Absent |
| 2.9 | 8.70 | 3.0 | x | Absent |

○: The battery can has the same appearance as that before the overcharge test.
Δ: The battery can has swelled, but has no problem.
x: The battery can has a hole.

As shown in Table 1, crimps of the lead pieces 9, 9' were present when B/A=1.0 to 1.4, and were absent when B/A=1.6 to 3.0. In a region where crimps of the lead pieces 9, 9' were present, the safety was x when B/A=1.0 to 1.2, and was Δ when B/A=1.4.

In a region where B/A=1.0 to 1.4, the distance of B in FIG. 2 was short, and crimps of the lead pieces 9,9' were generated. When crimps are generated, the lead pieces 9, 9' have lower strength at that portion. Thus, the lead pieces 9, 9' will be more likely to break in the event of an overcharge. In addition, as each of the lead pieces 9, 9' are arranged at substantially regular intervals on one side of the electrode as shown in FIG. 3, when the electrode is wound, the lead pieces 9, 9' will gather around the central portion of the wound electrode group 8. Thus, sufficient gas discharge cannot be achieved in the event of an overcharge, and the lead pieces 9, 9' will break, which results in an increased possibility of short. Consequently, it is considered that the result of safety when B/A=1.0 to 1.2 was x. Meanwhile, with regard to a battery with B/A=1.4, it is considered that the distance of B was effective for the discharge of gas from the central portion of the wound electrode group 8, and the result of safety was Δ. This is considered to be due to the fact that the distance B is effective for the discharge of gas, and contributes to a reduction of shorted portions that would occur due to the breaking of the lead pieces 9, 9'.

In addition, for regions of B/A=1.6 to 3.0 where there is no crimp of the lead pieces 9, 9', overcharge tests were conducted at B/A=1.6 to 3.0. However, the safety was x or Δ when B/A=2.2 to 3.0. It is considered that a trigger for the deterioration of the safety in such regions is not due to crimps of the lead pieces 9, 9' or the discharge of the gas from the central portion of the wound electrode group 8, but due to the amount of the electrolytic solution provided in the battery. As described previously, the distance B is adjusted by changing the thickness of the spacer 6 shown in FIG. 2, and the length of the cylindrical battery can 10 changes correspondingly. Therefore, the amount of the electrolytic solution will also change in terms of design. A lithium-ion battery generates a large amount of gas derived from an electrolytic solution when overcharged. The generated gas passes through A in FIG. 2, and reaches the cleavage valve 7, and is then discharged to the outside. At this time, the generated gas is discharged while at the same time generating heat of friction with the inner wall of the cylindrical battery can 10. Thus, the temperature of the inner wall of the portion A, which is a gas passage, will increase, and thus the deformation will easily occur.

As a result of the tests, when B/A=2.2 to 2.6, the battery can swelled at a position around the portion A in response to the gas generated from the electrolytic solution in the battery. Thus, the safety was Δ. However, in regions where B/A=2.8 to 3.0, a hole was generated around the portion A, and thus the safety was x. Consequently, the safety could be confirmed in the range of B/A=1.4 to 2.6 mm. In particular, preferable safety could be confirmed in the range of B/A=1.6 to 2.0 mm.

REFERENCE SIGNS LIST

1 Positive electrode
2 Separator
3 Negative electrode
4 Axial core
5, 5' Electrode poles
6 Spacer
7 Cleavage valve
8 Wound electrode group
9, 9' Lead pieces
10 Cylindrical battery can
11 Electrolytic solution injection port
12 Battery cap
13 Battery terminal

The invention claimed is:

1. A lithium-ion battery comprising:
a wound electrode group, the wound electrode group being formed by winding a positive electrode having a negative electrode active material layer formed on a surface thereof, a separator that retains an electrolyte, and a negative electrode having a positive electrode active material layer formed on a surface thereof, around an axial core;
an electrode pole arranged between the wound electrode group and a battery terminal, the electrode pole being configured to contribute to an electrical connection between the wound electrode group and the battery terminal;

lead pieces formed in strip form on an active-material-non-applied portion provided on a side of each of the positive electrode and the negative electrode, the lead pieces being electrically connected to the electrode pole;

a gap between the wound electrode group and the electrode pole; and a spacer, having a hollow columnar shape, that is arranged at a portion connecting the axial core and the electrode pole, wherein the spacer connects to a protruding portion that protrudes from the electrode pole;

wherein the wound electrode group, the electrode pole, and the lead pieces are housed in a battery can, the electrode pole is cylindrical in shape, and a value of B/A is 1.4 to 2.6, where a distance from an inner wall of the battery can to the electrode pole is A, a distance from the wound electrode group to the electrode pole is B, and the distance B is adjustable in accordance with a height of the spacer.

2. The lithium-ion battery according to claim 1, wherein the value of the B/A is 1.6 to 2.0.

* * * * *